(12) United States Patent
Chang et al.

(10) Patent No.: US 7,777,816 B2
(45) Date of Patent: Aug. 17, 2010

(54) APPARATUS AND METHOD FOR IMAGE ADJUSTMENT

(75) Inventors: Hsien Chun Chang, Keelung (TW); Chun Hsing Hsieh, Hsinchu (TW); Jin Sheng Gong, Longtan Township, Taoyuan County (TW)

(73) Assignee: Realtek Semiconductor Corp. (TW)

( * ) Notice: Subject to any disclaimer, the term of this patent is extended or adjusted under 35 U.S.C. 154(b) by 1288 days.

(21) Appl. No.: 11/290,211

(22) Filed: Nov. 29, 2005

(65) Prior Publication Data

US 2006/0114359 A1 Jun. 1, 2006

(30) Foreign Application Priority Data

Nov. 30, 2004 (TW) ................ 93136805 A

(51) Int. Cl.
*H04N 5/21* (2006.01)
(52) U.S. Cl. .................................... 348/620
(58) Field of Classification Search ........... None
See application file for complete search history.

(56) References Cited

U.S. PATENT DOCUMENTS

| | | | |
|---|---|---|---|
| 5,469,223 A * | 11/1995 | Kimura | 348/581 |
| 5,495,265 A | 2/1996 | Hartman et al. | |
| 5,808,697 A * | 9/1998 | Fujimura et al. | 348/672 |
| 6,304,254 B1 | 10/2001 | Johnson et al. | |
| 6,529,243 B1 * | 3/2003 | von Stein et al. | 348/340 |
| 6,579,239 B1 * | 6/2003 | Avinash et al. | 600/443 |
| 6,624,800 B2 | 9/2003 | Hughes et al. | |
| 6,642,971 B2 * | 11/2003 | Takeuchi | 348/746 |
| 6,678,006 B1 * | 1/2004 | Velez et al. | 348/564 |
| 6,894,669 B2 | 5/2005 | Suzuki et al. | |
| 6,970,207 B1 * | 11/2005 | Seigneret et al. | 348/607 |
| 2003/0048245 A1 | 3/2003 | Ham | |
| 2003/0098839 A1 | 5/2003 | Lee | |

* cited by examiner

*Primary Examiner*—Paulos M Natnael

(57) ABSTRACT

An apparatus for image adjustment and an associated method are disclosed. The apparatus can determine an adjusted value of a pixel in an image frame by comparing the pixel and a correspondingly located pixel in a previous image frame. When there is much image variation, an adjustment is made for each pixel in an original image frame for display, thereby providing better visual effects.

17 Claims, 4 Drawing Sheets

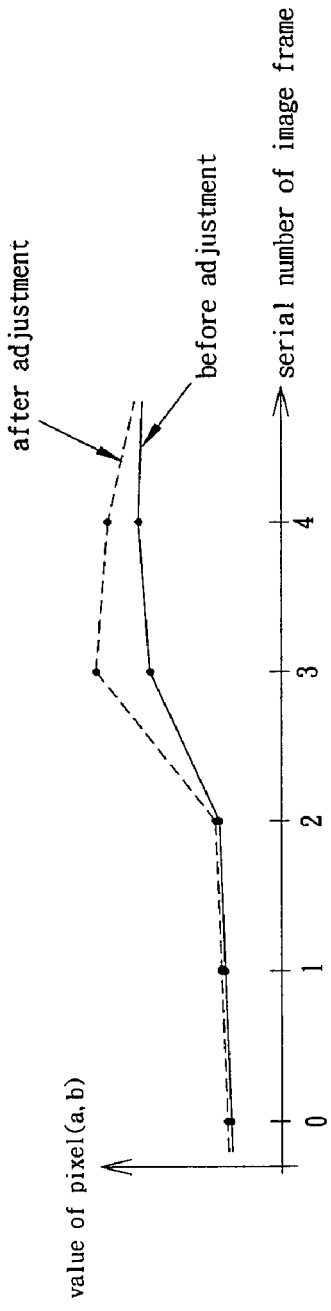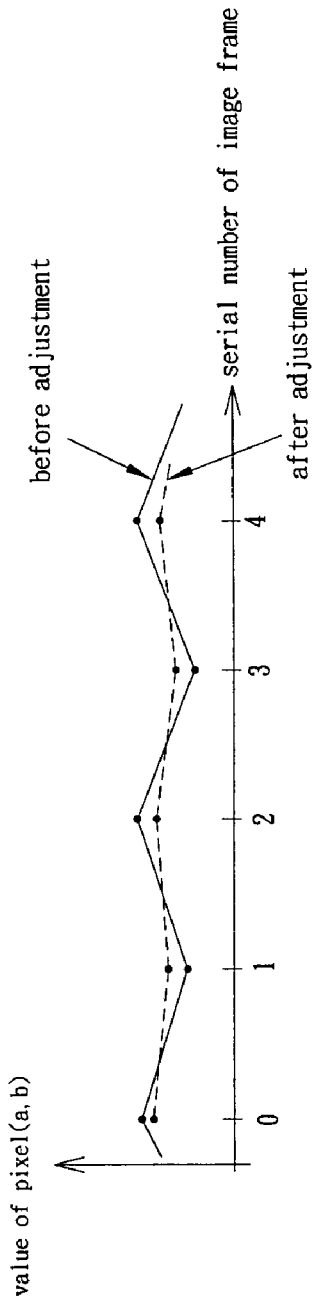

APPARATUS AND METHOD FOR IMAGE ADJUSTMENT

BACKGROUND OF THE INVENTION (a). Field of the Invention

The present invention relates to image processing, and more particularly, to an apparatus and method for adjusting image frames.

(b). Description of the Related Arts

When a video image (e.g. film) varies frequently or drastically, it is easy to result in undesirable visual effects, such as harsh screen flash, or insufficient contrast among a series of image frames, both of which causes obstruction to audience enjoyment. Thus, it is necessary to perform an image adjustment (contrast enhancement or reduction) before displaying this type of image with significant variation.

FIG. 1A and 1B are diagrams illustrating examples for adjusting the varying image. In FIG. 1A and 1B, the horizontal axis represents the order of image frames to be sequentially displayed, while the vertical axis represents the pixel value at a specific location (denoted by two dimensional coordinates (a, b)) of the various frames. The solid and dotted lines represent the pixel values before and after image adjustment respectively. In FIG. 1A, the pixel value remains less varied before frame 2, and increases drastically from frame 2 to frame 3. Thus, the adjusted pixel value is higher than the original one, thereby enhancing the contrast of the pixel. In FIG. 1B, the pixel value varies up and down violently. If the pixel is displayed directly, harsh flash effect occurs at this location of the image frame. Thus, the pixel value is adjusted to smoothen its variation, thereby reducing the contrast of the pixel and accordingly the undesirable visual effect.

SUMMARY OF THE INVENTION

It is therefore one of the objectives of this invention to provide an apparatus and method for adjusting an image frame according to previous image variation, thereby providing better visual effects.

According to one embodiment of this invention, an apparatus for image adjustment is provided. The apparatus receives a first original image frame and a second original image frame which is prior to the first original image frame. The apparatus comprises: a buffer for temporarily storing an adjusted image frame of the second original image frame; and an adjustment module, coupled to the buffer, for performing a filtering operation on a first pixel of the first original image frame according to pixel values of both the first pixel and a second pixel of the adjusted image frame of the second original image frame, and outputting an adjusted pixel of the first pixel. The location of the second pixel in the adjusted image frame of the second original image frame is corresponding to that of the first pixel in the first original image frame.

According to another embodiment of this invention, a method for adjusting image frames is provided. The method comprises steps of: receiving a first image frame and a second image frame, wherein the second image frame is prior to the first image frame; performing a filtering operation on a first pixel of the first image frame according to a difference value of the first pixel and a second pixel of the second image frame, wherein the location of the second pixel in the second image frame is corresponding to that of the first pixel in the first image frame; and outputting an adjusted pixel of the first pixel.

According to another embodiment of this invention, an apparatus for image adjustment is provided. The apparatus receives a first image frame and a second image frame which is prior to the first image frame. The apparatus comprises: a buffer for temporarily storing the second image frame; and an adjustment module, coupled to the buffer, for performing a filtering operation on a first pixel of the first image frame according to pixel values of both the first pixel and a second pixel of the second image frame, and outputting an adjusted pixel of the first pixel; wherein the location of the second pixel in the second image frame is corresponding to that of the first pixel in the first image frame.

In the above embodiments, the filtering operation achieves one of the following: enhancing, reducing and maintaining the contrast of the first pixel.

BRIEF DESCRIPTION OF THE DRAWINGS

FIGS. 1A and 1B are diagrams illustrating examples for adjusting the varying image.

DETAILED DESCRIPTION OF THE INVENTION

In a preferred embodiment of the method for image adjustment, an adjusted value for a first pixel of an image frame is determined according to the original value of the first pixel and the values of pixels at the same location in one or more previous image frames. When the adjusted values for all pixels of the image frame are determined, an adjusted image frame is generated. This kind of image adjustment can also be performed on a selected region of the image frame, or on a group of pixels of the image frame that satisfy some user-defined condition. In another embodiment, the adjusted value for the first pixel is determined according to the original value of the first pixel and the values of pixels around the first pixel.

The method for image adjustment mentioned above is implemented with the apparatus for image adjustment according to this invention. The apparatus employs a filter to determine the adjusted value of the first pixel. In an embodiment of the apparatus, an adjustable filter is employed. The adjustable filter is dynamically adjusted to a high-pass filter or a low-pass filter according to the comparison among the first pixel and the pixels (termed as previous pixels hereinafter) at the same location of the previous image frames. For example, if the comparison shows that the difference value of the first pixel and the last previous pixel is much larger than those among the previous pixels, then the adjustable filter is adjusted to the high-pass filter to enhance the contrast of the first pixel and to shorten the response time for the pixel variation; if the difference value of the first pixel and the last previous pixel is similar to those among the previous pixels and larger than a threshold value, then the adjustable filter is adjusted to the low-pass filter to reduce the contrast of the first pixel; and if the difference value of the first pixel and the last previous pixel is similar to those among the previous pixels and is not larger than the threshold value, then the adjustable filter would bypass the first pixel without any adjustment. This embodiment can be implemented by a logic circuit, firmware, software, or a combination thereof, all of which can be easily achieved by those of ordinary skill in the art. For an original image frame, there may be a portion of pixels undergoing a high-pass filtering, another portion of pixels undergoing a low-pass filtering, and still another portion bypassing without any adjustment. In this manner, an adjusted image frame can be generated with better visual effects.

Figure 2:
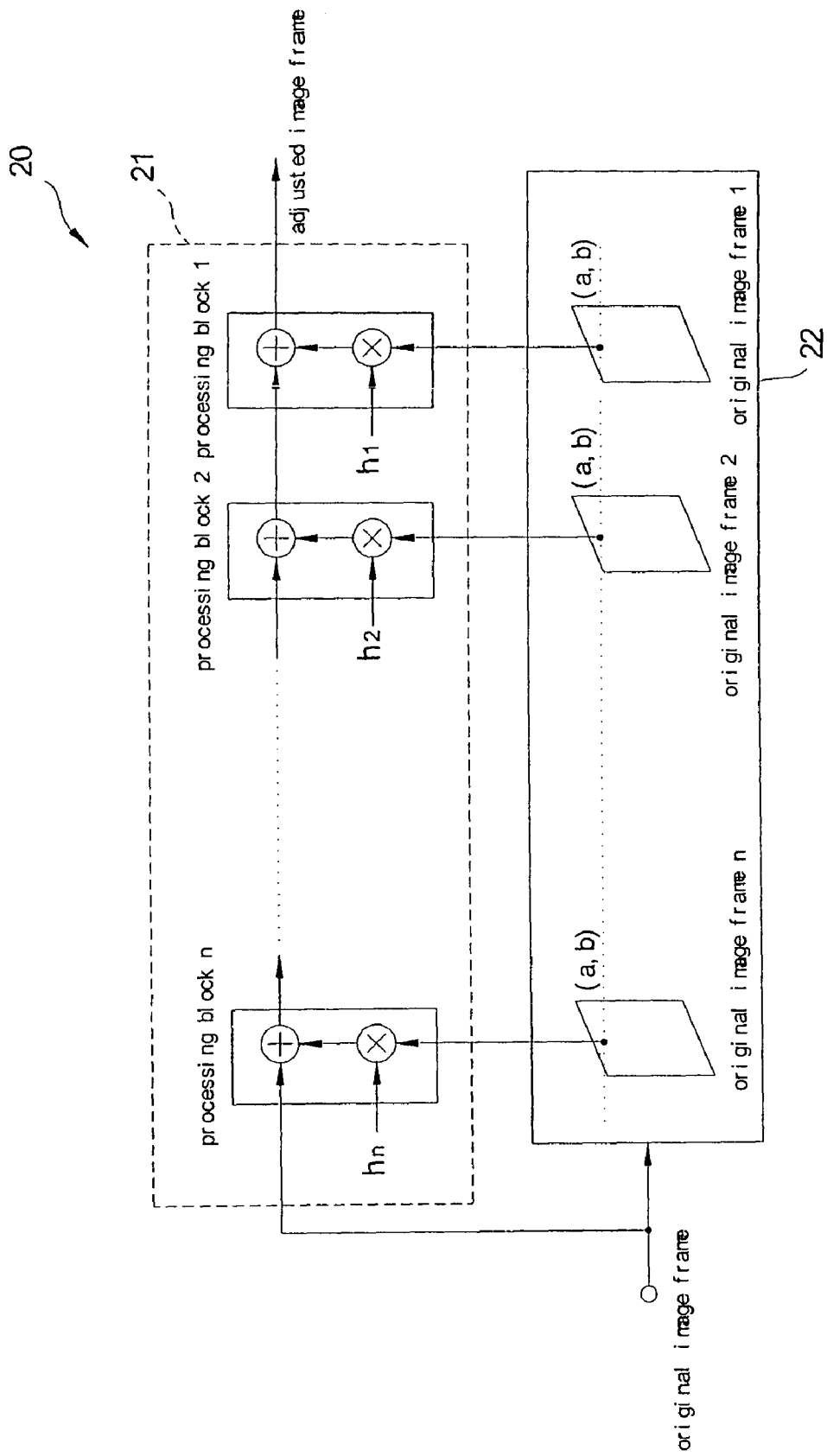
FIG. 2 is a block diagram of an embodiment apparatus for image adjustment according to the present invention.

FIG. 2 is a block diagram of an embodiment apparatus for image adjustment according to the present invention. In this embodiment, the apparatus 20 for image adjustment employs an nth-order finite impulse response (FIR) filter to determine the adjusted value of a pixel. As shown in FIG. 2, the apparatus 20 comprises an adjustment module 21 and a buffer 22, to both of which an original image frame is provided. The original image frame on the one hand, is sent to the buffer 22 for storage, and on the other hand, is sent to the adjustment module 21 for processing. After subsequent processing of processing block n, . . . processing block 2, and processing block 1, an adjusted image frame is generated. Each processing block k (k=1 through n) reads the buffer 22 to obtain the pixel value at a specific location (shown as (a, b)) of a previous original frame k, multiplies the read pixel value with a coefficient $h_k$, and then adds the output value of the previous processing block (k−1). The output value of processing block 1 is then the adjusted value of the pixel (a, b). That is, the adjusted value of the pixel (a, b) is determined according to the values of the pixel (a, b) in the original image frame and the previous original image frames 1 through n. By executing the above calculation for all pixels within the original image frame, the adjusted image frame is generated. In one embodiment, n may be of a value 1.

Figure 3:
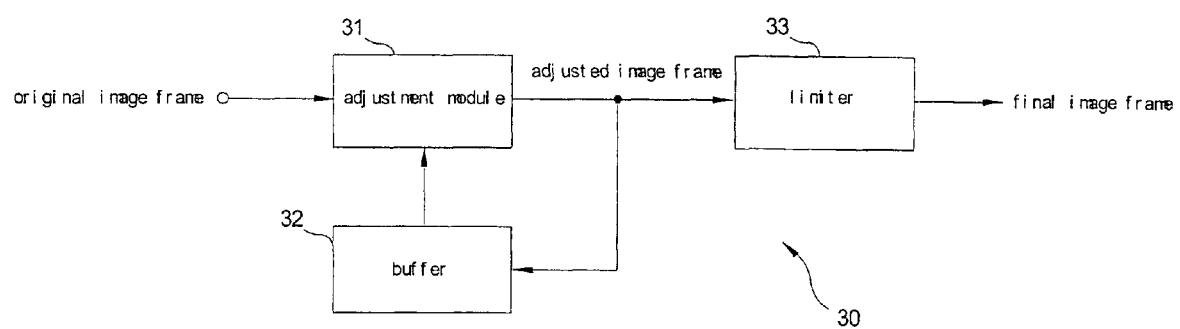
FIG. 3 is a block diagram of another embodiment apparatus for image adjustment according to the present invention.

FIG. 3 shows a block diagram of another embodiment apparatus for image adjustment according to the present invention. In this embodiment, the apparatus 30 for image adjustment employs an infinite impulse response (IIR) filter to determine the adjusted value of a pixel. As shown in FIG. 3, the apparatus 30 comprises an adjustment module 31 and a buffer 32. The adjustment module 31 receives a plurality of subsequent original image frames and performs an adjustment thereupon to output corresponding adjusted image frames. The buffer 32 is used to temporarily store the adjusted frame outputted by the adjustment module 31.

When adjusting an original image frame (denoted by original frame k) into an adjusted image frame (denoted by adjusted frame k), the adjustment module 31 also utilizes an adjusted image frame (denoted by adjusted frame (k−1)), stored in the buffer 32, of the last previous original image frame (i.e. original frame (k−1)). That is, the pixel value at a specific location of adjusted frame k is determined according to the pixel values at the same location of both original frame k and adjusted frame (k−1). Similarly, the pixel value at the specific location of adjusted frame (k−1) is determined according to the pixel values at the same location of both original frame (k−1) and adjusted frame (k−2). In this recursive manner, the pixel value at a specific location of an adjusted image frame is considered as determined according to those at the same location of the corresponding original image frame and a plurality of previous original image frames. In FIG. 3, the adjustment module 31 and the buffer 32 function jointly as a 1st-order IIR filter such that the method for image adjustment is implemented limited little buffer space (that is, only one image frame is stored).

Figure 4:
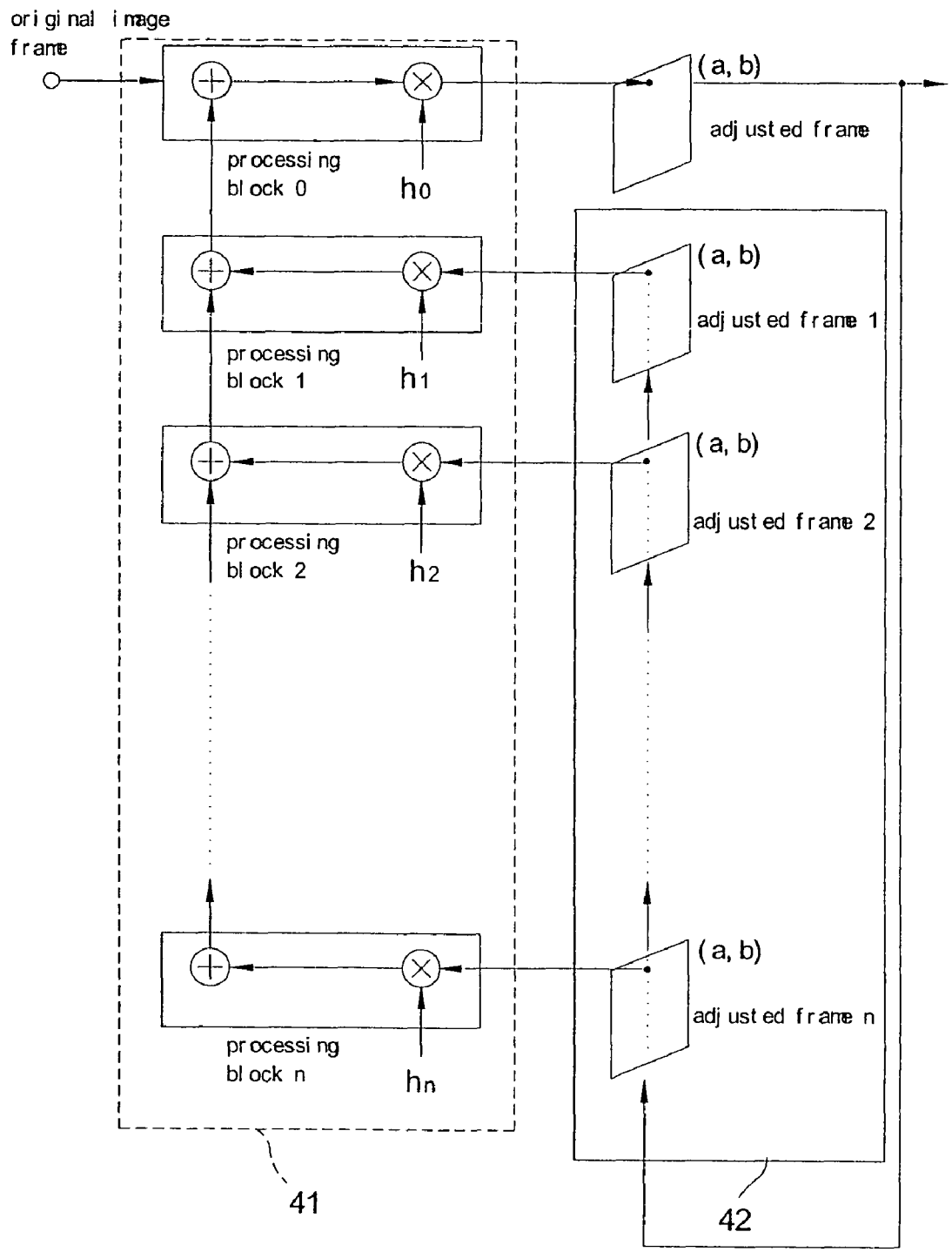
FIG. 4 is a block diagram of yet another embodiment apparatus for image adjustment according to the present invention.

FIG. 4 shows a block diagram of yet another embodiment apparatus for image adjustment according to the present invention. In this embodiment, the apparatus 40 for image adjustment employs an nth-order IIR filter to determine the adjusted value of a pixel. As shown in FIG. 4, the apparatus 40 comprises an adjustment module 41 and a buffer 42. The adjustment module 41 includes (n+1) processing blocks (i.e. processing block 0 through n), and the buffer 42 stores n previous adjusted image frames (i.e. adjusted frame 1 through n). The adjusted value for a pixel (a, b) of an original image frame is determined according to the values of the pixel (a, b) of the original image frame and n previous adjusted image frame.

In one embodiment, each processing block in FIG. 2 and FIG. 4 and the adjustment module 31 in FIG. 3 are implemented by a computation circuit, which includes an adder and a multiplier. Those processing blocks and the adjustment module 31 can also be implemented with a lookup table (LUT) or other linear or non-linear function blocks.

In another embodiment, the apparatuses for image adjustment in FIG. 2, FIG. 3, and FIG. 4 also comprise a limiter. Please refer to FIG. 3, where a limiter 33 coupled to the adjustment module 31 is shown. The limiter 33 has an upper limit and a lower limit. The upper and lower limits correspond to the hardware constraint of a display device, i.e. the allowable range of the pixel value. The limiter 33 receives an adjusted image frame from the adjustment module 31, and makes a decision on each adjusted pixel values therein. If the adjusted pixel value lies between the upper and lower limits, the limiter 33 outputs the adjusted pixel value directly; if the adjusted pixel value is larger/smaller than the upper/lower limit, the upper/lower limit is outputted instead. In other words, the portion of the pixel value exceeding the upper/lower limits is truncated through the limiter. In this manner, the limiter 33 generates a final image frame based on the adjusted image frame.

In one embodiment, the apparatus for image adjustment is used in a display controller. In another embodiment, the apparatus for image adjustment is embedded within an integrated circuit (IC).

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. An apparatus for image adjustment, the apparatus receiving a first original image frame and a second original image frame which is prior to the first original image frame, the apparatus comprising:
   a buffer for temporarily storing an adjusted image frame of the second original image frame;
   an adjustment module, coupled to the buffer, for performing a filtering operation on a first pixel of the first original image frame according to pixel values of both the first pixel and a second pixel of the adjusted image frame of the second original image frame, and outputting an adjusted pixel of the first pixel; and
   a limiter for receiving the adjusted pixel from the adjustment module and outputting the adjusted pixel according to an upper limit and a lower limit;
   wherein a location of the second pixel in the adjusted image frame of the second original image frame is corresponding to that of the first pixel in the first original image frame;
   wherein the filtering operation achieves one of the following: enhancing, reducing, and maintaining the contrast of the first pixel; and
   wherein if a current value of the adjusted pixel lies between the upper limit and the lower limit, the adjusted pixel is outputted according to the current value; if the current value is larger than the upper limit, the adjusted pixel is outputted according to the upper limit; and if the current value is smaller than the lower limit, the adjusted pixel is outputted according to the lower limit.

2. The apparatus of claim 1, wherein the buffer and the adjustment module function jointly as an infinite impulse response (IIR) filter.

3. The apparatus of claim 1, wherein the adjustment module comprises:
a high-pass filter for performing a high-pass filtering on the first pixel according to the pixel values of the first and second pixels to enhance the contrast of the first pixel.

4. The apparatus of claim 1, wherein the adjustment module comprises:
a low-pass filter for performing a low-pass filtering on the first pixel according to the pixel values of the first and second pixels to reduce the contrast of the first pixel.

5. The apparatus of claim 1, wherein the adjustment module comprises an adjustable filter which is switched between a high-pass mode and a low-pass mode according to the pixel values of the first and second pixels.

6. The apparatus of claim 1, wherein the adjustment module performs the filtering operation by means of a computation circuit or a lookup table.

7. The apparatus of claim 1, wherein the adjustment module performs the filtering operation on the first pixel according to a difference value of the first pixel and the second pixel.

8. A method for adjusting image frames comprising steps of:
receiving a first image frame and a second image frame, wherein the second image frame is prior to the first image frame;
performing a filtering operation on a first pixel of the first image frame according to a difference value of the first pixel and a second pixel of the second image frame, wherein a location of the second pixel in the second image frame is corresponding to that of the first pixel in the first image frame; and
outputting an adjusted pixel of the first pixel;
wherein the filtering operation achieves one of the following: enhancing, reducing, and maintaining the contrast of the first pixel; and
wherein the second image frame is previously adjusted before the step of performing the filtering operation on the first pixel.

9. The method of claim 8, wherein the performing step comprises a high-pass filtering step to enhance the contrast of the first pixel according to the difference value.

10. The method of claim 8, wherein the performing step comprises a low-pass filtering step to reduce the contrast of the first pixel according to the difference value.

11. An apparatus for image adjustment, the apparatus receiving a first image frame and a second image frame which is prior to the first image frame, the apparatus comprising:

a buffer for temporarily storing the second image frame; and
an adjustment module, coupled to the buffer, for performing a filtering operation on a first pixel of the first image frame according to pixel values of both the first pixel and a second pixel of the second image frame, and outputting an adjusted pixel of the first pixel;
wherein a location of the second pixel in the second image frame is corresponding to that of the first pixel in the first image frame;
wherein the filtering operation achieves one of the following: enhancing, reducing, and keeping the contrast of the first pixel; and
wherein the adjustment module comprises an adjustable filter which is switched between a high-pass mode and a low-pass mode according to the pixel values of the first and second pixels.

12. The apparatus of claim 11, wherein the buffer and the adjustment module function jointly as a finite impulse response (FIR) filter.

13. The apparatus of claim 11, wherein the adjustment module comprises:
a high-pass filter for performing a high-pass filtering on the first pixel according to the pixel values of the first and second pixels to enhance the contrast of the first pixel.

14. The apparatus of claim 11, wherein the adjustment module comprises:
a low-pass filter for performing a low-pass filtering on the first pixel according to the pixel values of the first and second pixels to reduce the contrast of the first pixel.

15. The apparatus of claim 11, further comprising:
a limiter for receiving the adjusted pixel from the adjustment module and outputting the adjusted pixel according to an upper limit and a lower limit;
wherein if a current value of the adjusted pixel lies between the upper limit and the lower limit, the adjusted pixel is outputted according to the current value; if the current value is larger than the upper limit, the adjusted pixel is outputted according to the upper limit; and if the current value is smaller than the lower limit, the adjusted pixel is outputted according to the lower limit.

16. The apparatus of claim 11, wherein the adjustment module performs the filtering operation by means of a computation circuit or a lookup table.

17. The apparatus of claim 11, wherein the adjustment module performs the filtering operation on the first pixel according to a difference value of the first pixel and the second pixel.

* * * * *